(12) United States Patent
Binek et al.

(10) Patent No.: US 11,808,455 B2
(45) Date of Patent: Nov. 7, 2023

(54) GAS TURBINE ENGINE COMBUSTOR WITH INTEGRAL FUEL CONDUIT(S)

(71) Applicant: Raytheon Technologies Corporation, Farmington, CT (US)

(72) Inventors: Lawrence A. Binek, Glastonbury, CT (US); Timothy S. Snyder, Glastonbury, CT (US); Sean R. Jackson, Palm City, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/535,133

(22) Filed: Nov. 24, 2021

(65) Prior Publication Data

US 2023/0160574 A1 May 25, 2023

(51) Int. Cl.
*F23R 3/00* (2006.01)
*F23R 3/28* (2006.01)

(52) U.S. Cl.
CPC ............... *F23R 3/28* (2013.01); *F23R 3/002* (2013.01)

(58) Field of Classification Search
CPC .. F23R 3/00; F23R 3/002; F23R 3/005; F23R 3/28
See application file for complete search history.

(56) References Cited

U.S. PATENT DOCUMENTS

| | | | |
|---|---|---|---|
| 1,460,470 A | 7/1923 | Joseph | |
| 2,385,833 A | 10/1945 | Nahigyan | |
| 2,616,258 A | 11/1952 | Mock | |
| 2,727,358 A | 12/1955 | Leslie | |
| 3,053,461 A | 9/1962 | Inglis | |
| 3,153,323 A | 10/1964 | Hamm | |
| 3,430,443 A | 3/1969 | Richardson | |
| 3,603,711 A | 9/1971 | Downs | |
| 3,693,354 A | 9/1972 | Hull, Jr. | |
| 3,693,889 A | 9/1972 | Schuster | |
| 3,777,983 A | 12/1973 | Hibbins | |
| 3,844,116 A | 10/1974 | Matto | |
| 3,886,736 A | 6/1975 | Kawaguchi | |
| 3,915,137 A | 10/1975 | Evans | |
| 3,937,007 A | 2/1976 | Kappler | |
| 4,028,044 A | 6/1977 | Carlisle | |
| 4,081,958 A | 4/1978 | Schelp | |
| 4,134,260 A | 1/1979 | Lefebvre | |
| 4,242,863 A | 1/1981 | Bailey | |
| 4,295,821 A | 10/1981 | Schilling | |
| 4,305,255 A * | 12/1981 | Davies | F23R 3/38 60/741 |

(Continued)

FOREIGN PATENT DOCUMENTS

EP 2808610 A1 12/2014

OTHER PUBLICATIONS

EP search report for EP22209386.6 dated Apr. 3, 2023.

*Primary Examiner* — William H Rodriguez
(74) *Attorney, Agent, or Firm* — GETZ BALICH LLC

(57) ABSTRACT

An assembly is provided for a gas turbine engine. This assembly includes a combustor and a fuel conduit. The combustor includes a combustor wall that forms a peripheral boundary of a combustion chamber within the combustor. The fuel conduit extends along and is formed integral with the combustor wall. The fuel conduit is disposed outside of the combustion chamber.

18 Claims, 7 Drawing Sheets

(56) References Cited

U.S. PATENT DOCUMENTS

| | | | |
|---|---|---|---|
| 4,819,423 A * | 4/1989 | Vershure, Jr. | B64D 41/00 |
| | | | 60/778 |
| 5,129,226 A | 7/1992 | Bigelow | |
| 5,133,192 A | 7/1992 | Overton | |
| 5,423,178 A | 6/1995 | Mains | |
| 5,568,721 A | 10/1996 | Alary | |
| 5,836,163 A | 11/1998 | Lockyer | |
| 5,873,237 A | 2/1999 | Medla | |
| 6,438,961 B2 | 8/2002 | Tuthill | |
| 6,460,344 B1 | 10/2002 | Steinthorsson | |
| 6,490,864 B1 | 12/2002 | Joos | |
| 6,672,066 B2 | 1/2004 | Wrubel | |
| 6,931,862 B2 | 8/2005 | Harris | |
| 7,870,736 B2 | 1/2011 | Homitz | |
| 7,891,191 B2 | 2/2011 | Yoshida | |
| 7,954,328 B2 | 6/2011 | Atassi | |
| 9,062,609 B2 | 6/2015 | Mehring | |
| 9,383,145 B2 | 7/2016 | Weber | |
| 9,803,498 B2 | 10/2017 | Jewess | |
| 10,570,865 B2 | 2/2020 | Zhang | |
| 10,619,855 B2 | 4/2020 | Brogan | |
| 10,739,005 B2 | 8/2020 | Kironn | |
| 10,816,207 B2 | 10/2020 | Fryer | |
| 10,976,053 B2 | 4/2021 | Boardman | |
| 11,118,784 B2 * | 9/2021 | Sweeney | F02C 3/06 |
| 2002/0069645 A1 | 6/2002 | Mowill | |
| 2004/0226297 A1 * | 11/2004 | Griffin | F23C 7/002 |
| | | | 60/737 |
| 2006/0213180 A1 | 9/2006 | Koshoffer | |
| 2007/0044476 A1 | 3/2007 | Koshoffer | |
| 2008/0201008 A1 | 8/2008 | Twelves, Jr. | |
| 2009/0020266 A1 | 1/2009 | Weber | |
| 2009/0255264 A1 | 10/2009 | McMasters | |
| 2009/0260365 A1 | 10/2009 | Muldoon | |
| 2010/0050653 A1 | 3/2010 | Lam | |
| 2010/0281871 A1 | 11/2010 | Hadley | |
| 2011/0289928 A1 | 12/2011 | Fox | |
| 2011/0296839 A1 | 12/2011 | Van Nieuwenhuizen | |
| 2012/0304648 A1 * | 12/2012 | Byrne | F23R 3/06 |
| | | | 60/737 |
| 2013/0098048 A1 | 4/2013 | Popovic | |
| 2015/0020528 A1 * | 1/2015 | Fuller | F02C 7/222 |
| | | | 60/746 |
| 2015/0159513 A1 * | 6/2015 | Riahi | F01D 9/041 |
| | | | 415/137 |
| 2016/0209041 A1 | 7/2016 | Twelves, Jr. | |
| 2018/0340689 A1 | 11/2018 | Woodlock | |
| 2020/0109663 A1 | 4/2020 | Binek | |
| 2020/0123919 A1 | 4/2020 | Hall | |
| 2020/0398386 A1 | 12/2020 | Binek | |
| 2021/0025593 A1 | 1/2021 | Ryon | |
| 2021/0254832 A1 | 8/2021 | Binek | |

* cited by examiner

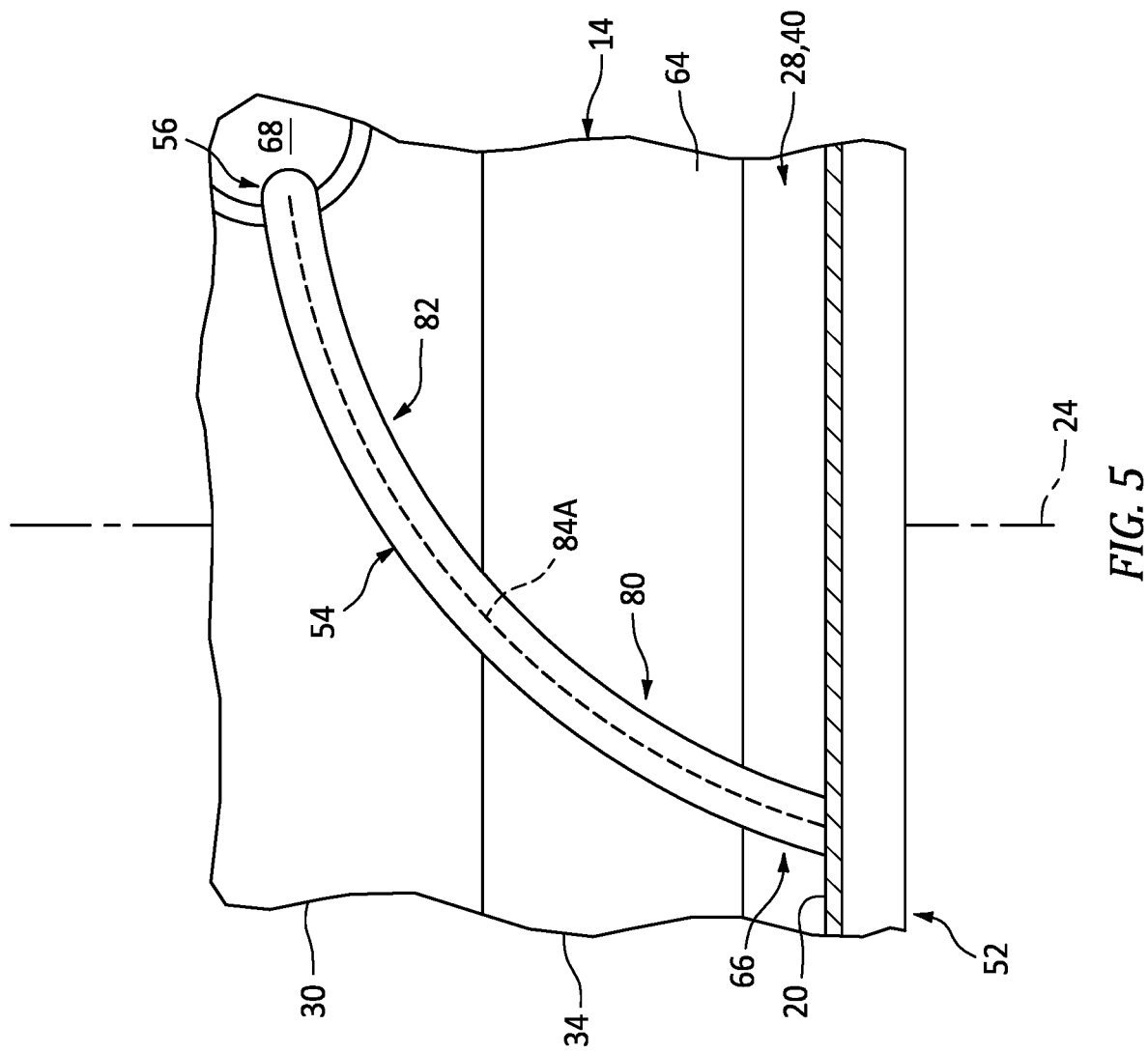
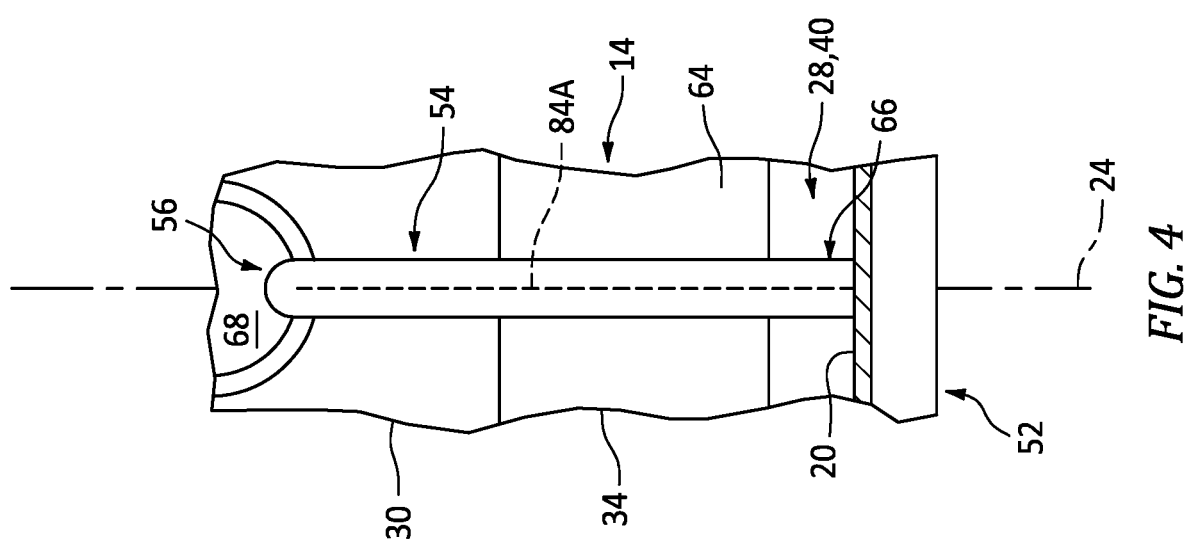

GAS TURBINE ENGINE COMBUSTOR WITH INTEGRAL FUEL CONDUIT(S)

BACKGROUND OF THE DISCLOSURE

1. Technical Field

This disclosure relates generally to a gas turbine engine and, more particularly, to a fuel system for a combustor section of the gas turbine engine.

2. Background Information

A modern gas turbine engine includes a fuel system for delivering fuel to an array of fuel injectors arranged with a combustor. These fuel injectors inject fuel into a combustion chamber within the combustor for subsequent combustion. Various types and configurations of fuel systems are known in the art. While these known fuel systems have various benefits, there is still room in the art for improvement. There is a need in the art, for example, for a fuel system which can complement operation of another turbine engine component and/or system.

SUMMARY OF THE DISCLOSURE

According to an aspect of the present disclosure, an assembly is provided for a gas turbine engine. This assembly includes a combustor and a fuel conduit. The combustor includes a combustor wall that forms a peripheral boundary of a combustion chamber within the combustor. The fuel conduit extends along and is formed integral with the combustor wall. The fuel conduit is disposed outside of the combustion chamber.

According to another aspect of the present disclosure, another assembly is provided for a gas turbine engine. This assembly includes a combustor and a fuel conduit. The combustor includes an outer sidewall, an inner sidewall, a bulkhead and a combustion chamber. The combustion chamber extends radially within the combustor between the outer sidewall and the inner sidewall. The combustion chamber extends axially within the combustor to the bulkhead. The fuel conduit extends along and is connected to the bulkhead. At least the fuel conduit and the bulkhead are formed together in a monolithic body.

According to still another aspect of the present disclosure, another assembly is provided for a gas turbine engine. This assembly includes a combustor, a fuel conduit and a fuel injector. The combustor includes a combustor wall that forms a peripheral boundary of a combustion chamber within the combustor. The fuel conduit extends along and is thermally coupled with the combustor wall. The fuel conduit is arranged on an exterior of the combustor and outside of the combustion chamber. The fuel injector is configured to receive fuel from the fuel conduit and inject the fuel into the combustion chamber.

The fuel conduit may extend along and may be connected to the outer sidewall.

The fuel conduit may be disposed outside of the combustor.

The assembly may also include a turbine engine case and a fuel manifold. The turbine engine case may circumscribe and may be spaced from the combustor. The fuel manifold may extend along and may be connected to the turbine engine case. The fuel manifold may be fluidly coupled with the fuel conduit.

The monolithic body may also include the turbine engine case and the fuel manifold.

The assembly may also include a fuel injector arranged with the combustor. The fuel injector may be configured to receive fuel from the fuel conduit and inject the fuel into the combustion chamber.

The fuel injector may be formed integral with the combustor and the fuel conduit.

The assembly may also include a turbine engine case, a plenum and a fuel manifold. The plenum may be formed by and disposed between the turbine engine case and the combustor wall. The fuel manifold may extend along and may be formed integral with the turbine engine case. The fuel manifold may be fluidly coupled with the fuel conduit.

The assembly may also include a second fuel conduit extending along and formed integral with the combustor wall. The second fuel conduit may be disposed outside of the combustion chamber. The fuel manifold may be fluidly coupled with the second fuel conduit.

A segment of the fuel conduit may project out from the combustor, through the plenum, to the turbine engine case.

The combustor may include an inner sidewall, an outer sidewall and a bulkhead extending radially between and connected to the inner sidewall and the outer sidewall. The bulkhead may be configured as or otherwise include the combustor wall.

The fuel conduit may also extend along and may be formed integral with the outer sidewall.

The combustor may include an inner sidewall, an outer sidewall and a bulkhead extending radially between and connected to the inner sidewall and the outer sidewall. The outer sidewall may be configured as or otherwise include the combustor wall.

The assembly may also include a fuel injector arranged with the combustor and fluidly coupled with the fuel conduit. A segment of the fuel conduit may be laterally offset from the fuel injector.

The assembly may also include a fuel injector arranged with the combustor and fluidly coupled with the fuel conduit. A segment of the fuel conduit may be circumferentially clocked from the fuel injector about a centerline of the gas turbine engine between five degrees and twenty-five degrees.

The assembly may also include a fuel injector arranged with the combustor and fluidly coupled with the fuel conduit. A segment of the fuel conduit may be laterally aligned with the fuel injector.

At least a segment of the fuel conduit may follow a straight trajectory as the fuel conduit extends along the combustor wall.

At least a segment of the fuel conduit may follow a non-straight trajectory as the fuel conduit extends along the combustor wall.

A segment of the fuel conduit may extend along and/or may be spaced from the combustor wall.

The assembly may also include a nozzle. The combustor may meet the nozzle at a slip joint between the combustor and the nozzle.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 4 is a partial cutaway illustration of the turbine engine assembly, where the fuel conduit for the fuel system has a first configuration.

FIG. 5 is a partial cutaway illustration of the turbine engine assembly, where the fuel conduit has a second configuration.

DETAILED DESCRIPTION

Figure 1:
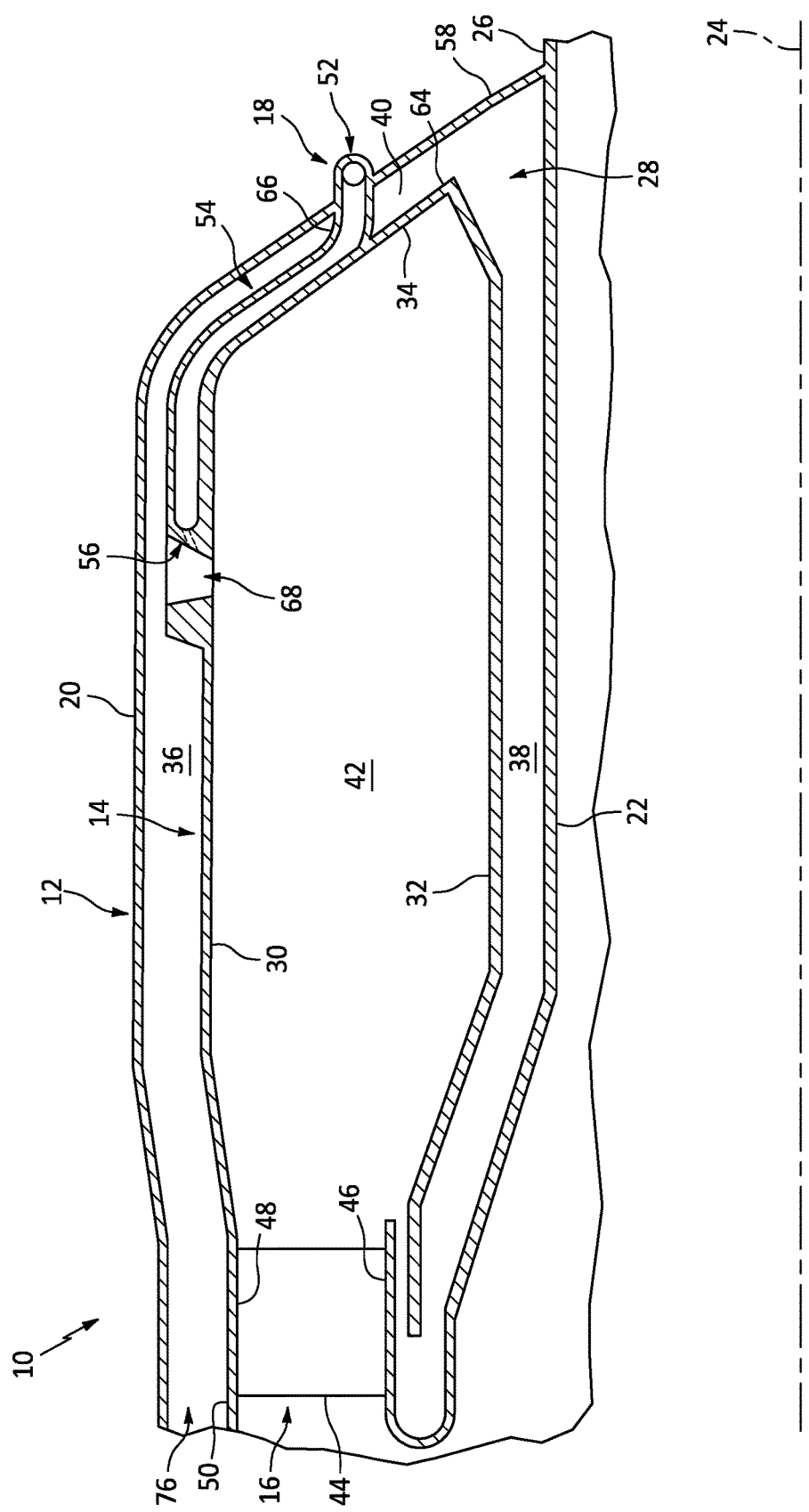
FIG. 1 is a partial side sectional illustration of an assembly for a gas turbine engine.

FIG. 1 is a partial side sectional illustration of an assembly 10 for a gas turbine engine. This turbine engine assembly 10 includes a (e.g., annular) diffuser structure 12, a (e.g., annular) combustor 14 and an exit nozzle 16. The turbine engine assembly 10 also includes a fuel system 18.

The diffuser structure 12 of FIG. 1 includes one or more cases 20 and 22 of the gas turbine engine. The outer case 20 may be configured as an outer diffuser wall. The inner case 22 may be configured as an inner diffuser wall, an inner turbine wall and/or an exhaust manifold. Each of these turbine engine cases 20, 22 extends axially along an axial centerline 24 of the turbine engine assembly 10, which centerline 24 may also be an axial centerline and/or a rotational axis of the gas turbine engine. Each of the turbine engine cases 20, 22 extends circumferentially about (e.g., completely around) the axial centerline 24. The outer case 20 circumscribes, axially overlaps and is disposed outward of the inner case 22. The outer case 20 is connected to the inner case 22 at (e.g., on, adjacent or proximate) an (e.g., aft and/or downstream) end 26 of the diffuser structure 12. The outer case 20 of FIG. 1 is otherwise spaced radially outward from the inner case 22 to form a diffuser plenum 28 (e.g., an open internal volume, a cavity, etc.) between the turbine engine cases 20 and 22.

The combustor 14 is disposed within the diffuser structure 12 radially between the outer case 20 and the inner case 22. The combustor 14 includes one or more combustor walls, which combustor walls of FIG. 1 include a (e.g., tubular) combustor outer sidewall 30, a (e.g., tubular) combustor inner sidewall 32 and a (e.g., annular) combustor bulkhead 34; e.g., a combustor dome. Each of the combustor sidewalls 30, 32 extends axially along the axial centerline 24 to the bulkhead 34. Each of the combustor sidewalls 30, 32 extends circumferentially about (e.g., completely around) the axial centerline 24. The outer sidewall 30 circumscribes, axially overlaps and is radially spaced from the inner sidewall 32, and the outer case 20 circumscribes, axially overlaps and is radially spaced from the outer sidewall 30. The inner sidewall 32 circumscribes, axially overlaps and is radially spaced from the inner case 22. The bulkhead 34 extends radially between and is connected to the outer sidewall 30 and the inner sidewall 32 towards the diffuser structure end 26. The bulkhead 34 is axially spaced from the outer case 20.

With the foregoing arrangement, the diffuser plenum 28 of FIG. 1 is formed by and extends radially and/or axially between the diffuser structure 12 and the combustor 14. More particularly, an (e.g., annular) outer region 36 of the diffuser plenum 28 is formed by and extends radially between and to the outer sidewall 30 and the outer case 20. An (e.g., annular) inner region 38 of the diffuser plenum 28 is formed by and extends radially between and to the inner sidewall 32 and the inner case 22. An (e.g., annular) end region 40 of the diffuser plenum 28 is formed by and extends axially between and to the bulkhead 34 and the outer case 20.

The combustor 14 is configured with an internal (e.g., annular) combustion chamber 42. This combustion chamber 42 extends circumferentially about (e.g., completely around) the axial centerline 24 within the combustor 14. The combustion chamber 42 extends radially within the combustor 14 between and to the outer sidewall 30 and the inner sidewall 32. The combustion chamber 42 extends axially within the combustor 14 to the bulkhead 34. The outer sidewall 30 thereby forms a radial outer peripheral boundary of the combustion chamber 42. The inner sidewall 32 forms a radial inner peripheral boundary of the combustion chamber 42. The bulkhead 34 forms an axial end peripheral boundary of the combustion chamber 42.

The exit nozzle 16 is disposed at an outlet of the combustor 14. The exit nozzle 16 is configured to condition combustion products exiting the combustion chamber 42. The exit nozzle 16 of FIG. 1, for example, includes one or more guide vanes 44 (one visible in FIG. 1) which impart swirl to the combustion products exiting the combustion chamber 42. The guide vanes 44 are distributed circumferentially about the axial centerline 24 in an annular array. Each of the guide vanes 44 extends radially between and is connected to an inner platform 46 and an outer platform 48. The inner platform 46 may be aligned with, connected to and/or part of the inner case 22. The outer platform 48 may be aligned with, connected to and/or part of the outer sidewall 30 and/or another case 50 of the gas turbine engine, which turbine engine case 50 may be configured as an outer turbine case and/or an inner plenum inlet wall.

Figure 2:
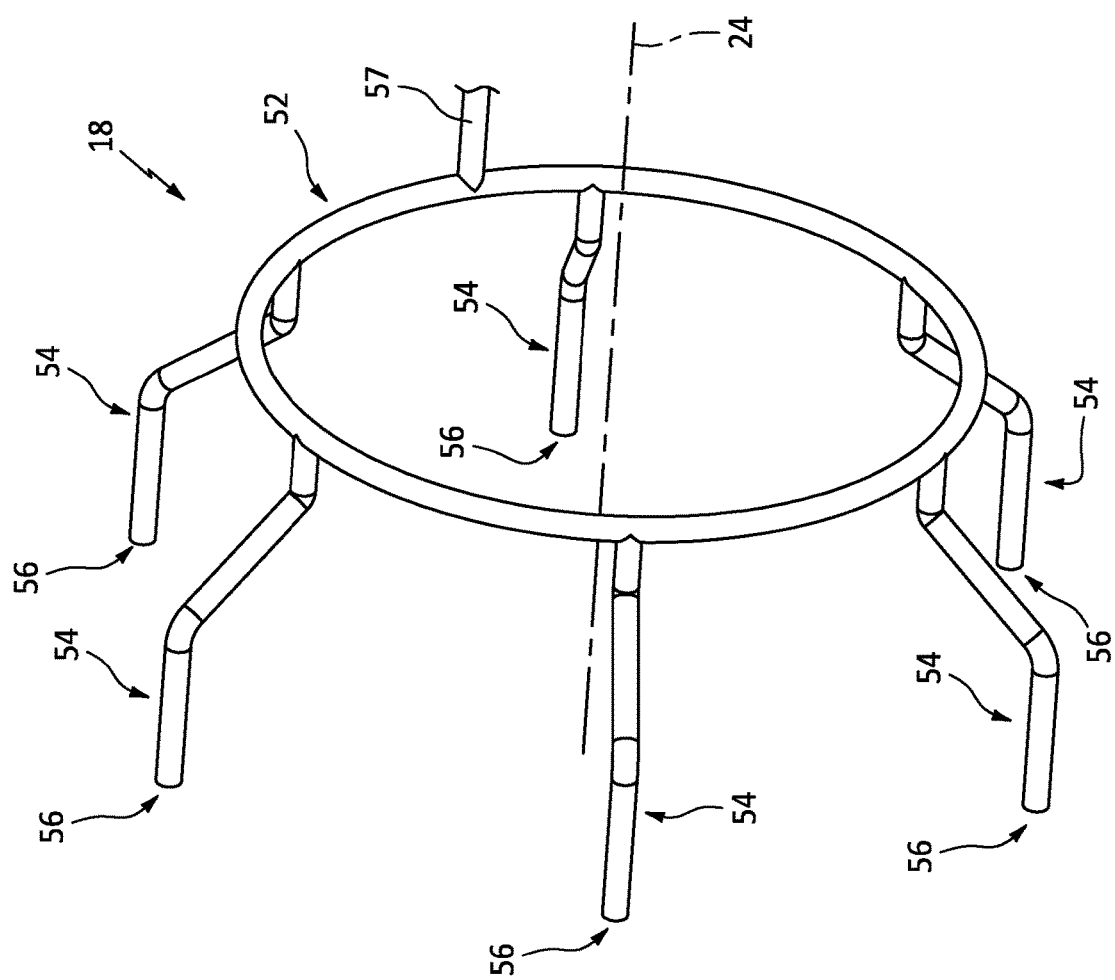
FIG. 2 is a schematic, perspective illustration of a fuel system for the gas turbine engine.

Referring to FIG. 2, the fuel system 18 includes a fuel manifold 52, one or more fuel conduits 54 and one or more fuel injectors 56. The fuel system 18 also includes at least one feed line 57; e.g., an inlet conduit. The fuel manifold 52 is configured to supply fuel received from a fuel source through the feed line 57 to the fuel conduits 54, which may be fluidly coupled to the fuel manifold 52 in parallel. Each of the fuel conduits 54 is configured to direct the fuel received from the fuel manifold 52 to a respective one of the fuel injectors 56. Each of the fuel injectors 56 is configured to direct (e.g., inject) the fuel received from the respective fuel conduit 54 into the combustion chamber 42 (see FIG. 3) (or another volume such as a flow tube) for subsequent combustion within the combustion chamber 42.

Figure 3:
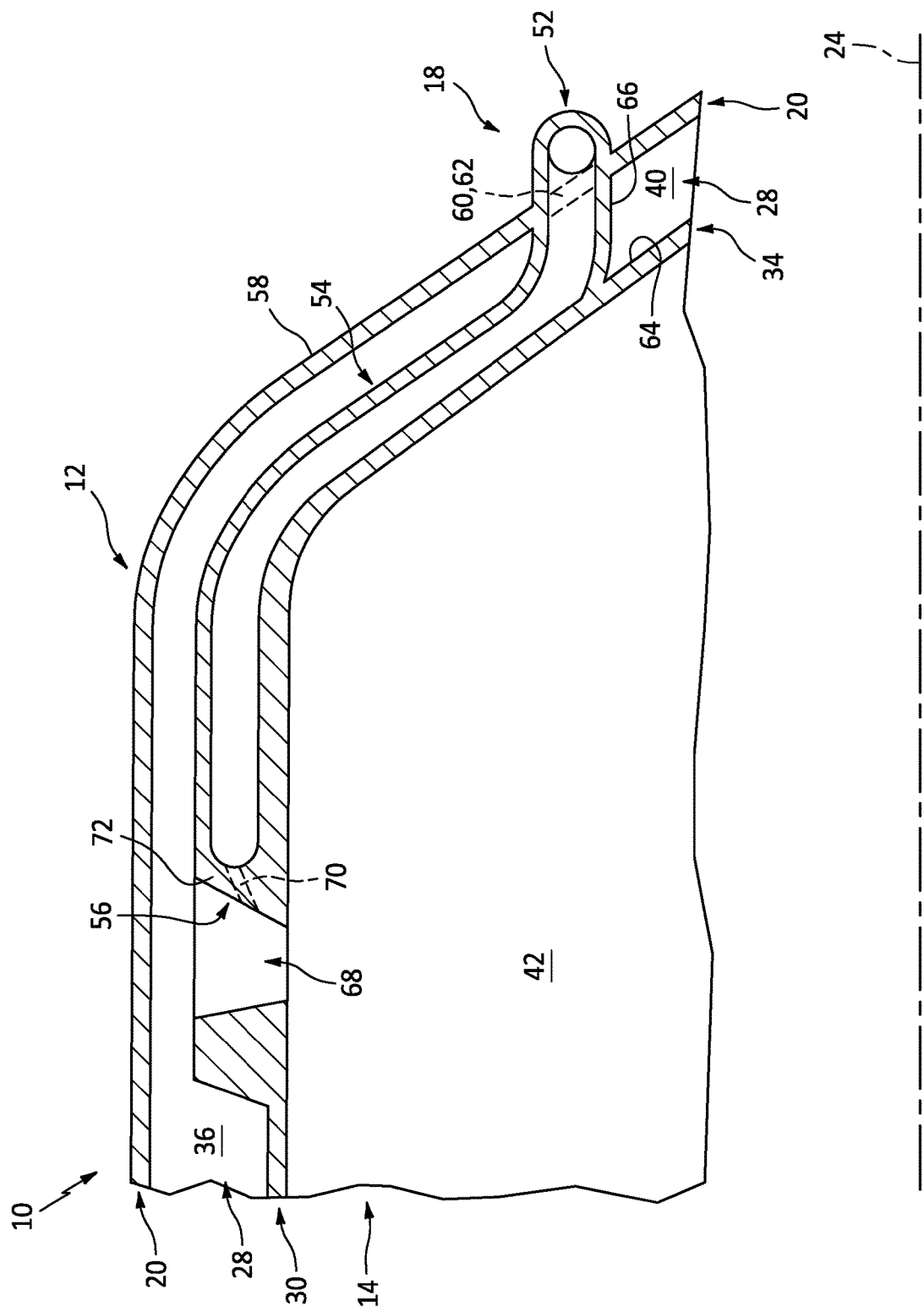
FIG. 3 is a partial side sectional illustration of the fuel system configured with a combustor and a diffuser structure.

The fuel manifold 52 of FIG. 2 extends circumferentially about (e.g., completely around) the axial centerline 24. The fuel manifold 52 of FIG. 3 is arranged at an exterior 58 of the diffuser structure 12 proximate the diffuser structure end 26; see FIG. 1. An entirety of the fuel manifold 52, for example, may be located outside of the diffuser plenum 28 and, more generally, outside of the diffuser structure 12 and its turbine engine cases 20 and 22; see also FIG. 1. The fuel manifold 52 is connected to and extends longitudinally (e.g., in a circumferential direction; see FIG. 2) along the outer case 20. The fuel manifold 52 of FIG. 3, for example, is formed integral with the outer case 20. Herein, the term "integral" may describe an element that is formed monolithically with, non-servable from, as a common part with and/or otherwise configured with another element such that those elements, for example, share at least one common feature and/or structure. The fuel manifold 52 of FIG. 3, for example, is configured with the outer case 20 such that a portion 60 of the outer case 20 forms a portion 62 of the fuel manifold 52 and/or the portion 62 of the fuel manifold 52 forms the portion 60 of the outer case 20. Such an integral configuration may also (e.g., directly) thermally couple the integrally formed elements together to facilitate enhance heat transfer between those elements.

The fuel conduits 54 of FIG. 2 are distributed circumferentially about the axial centerline 24 in an annular array. Each of these fuel conduits 54 extends longitudinally between and is fluidly coupled to the fuel manifold 52 and a respective one of the fuel injectors 56. Each fuel conduit 54 of FIG. 3 is arranged at an exterior 64 of the combustor 14. An entirety of each fuel conduit 54, for example, may be located outside of the combustion chamber 42 and, more generally, outside of the combustor 14 and its combustor walls 30 and 34; see also FIG. 1. Each fuel conduit 54 is connected to and extends longitudinally along (e.g., in a radial, an axial and/or a circumferential direction; see also FIG. 2) the combustor 14. Each fuel conduit 54 of FIG. 3, for example, is formed integral with the outer sidewall 30 and the bulkhead 34. However, an upstream segment 66 of each fuel conduit 54 may project out from the combustor 14 and its bulkhead 34, axially through the diffuser plenum 28, to the outer case 20 to meet/couple with the fuel manifold 52. This upstream segment 66 of the fuel conduit 54 may also be formed integral with (or otherwise connected to) the outer case 20 and/or the fuel manifold 52.

Figure 3A:
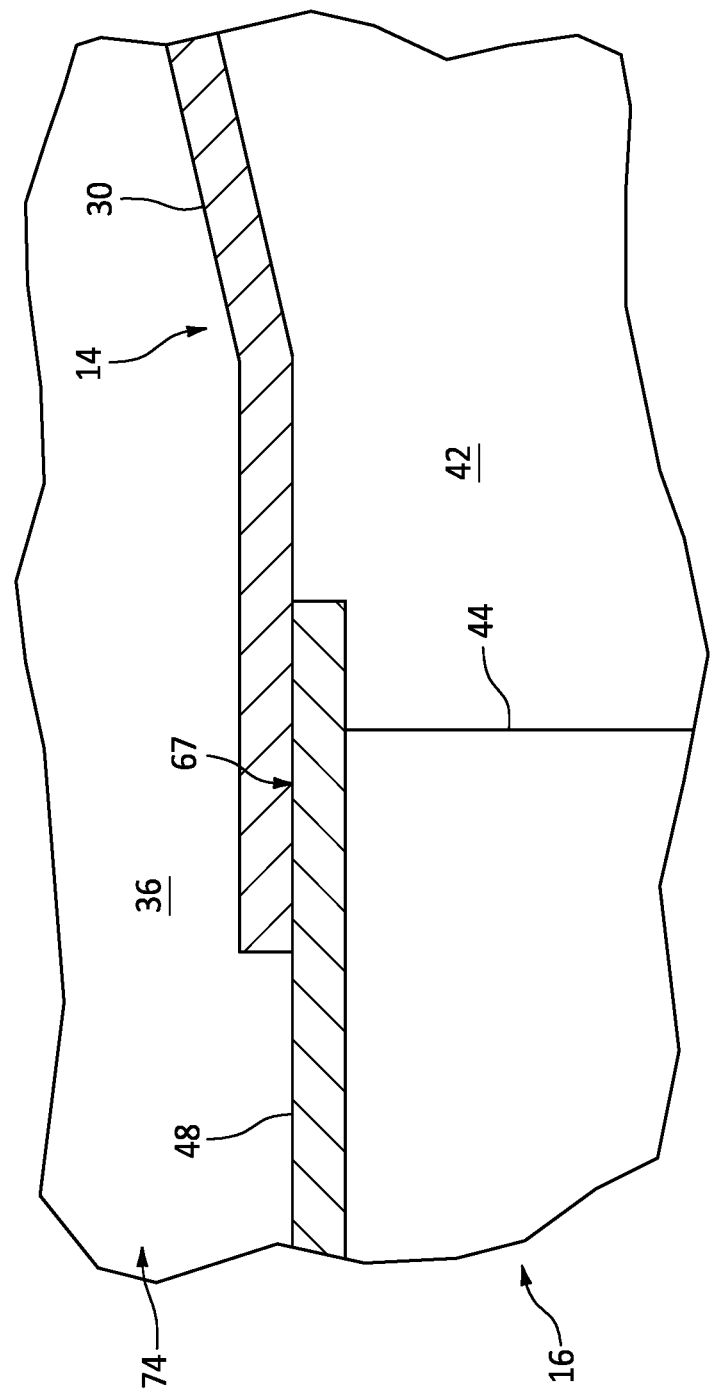
FIG. 3A is a side sectional illustration of a slip joint between a combustor and a nozzle.

During gas turbine operation, there may be thermal growth differences between the outer case 20 and the combustor 14 and its combustor walls 30, 32 and 34 (see also FIG. 1). To reduce thermally induced stresses on the upstream segments 66 (portions of the fuel conduits 54 extending between the combustor 14 and the outer case 20), the combustor 14 and, for example, its bulkhead 34 may be rigidly attached to the outer case 20 at (e.g., in, adjacent or proximate) locations of the upstream segments 66. The combustor 14 of FIG. 1, however, may be structurally decoupled from the outer case 20 forward of the upstream segments 66 (see also FIG. 3) to facilitate axially growth of the combustor 14 and its combustor walls 30, 32 and 34 along the axial centerline 24 towards the exit nozzle 16 (see FIG. 1) independent of the outer case 20. In addition or alternatively, referring to FIG. 3A, the combustor 14 and its outer sidewall 30 may meet the exit nozzle 16 and its outer platform 48 at a slip joint 67 between the combustor 14 and the exit nozzle 16. The outer sidewall 30 of FIG. 3A, for example, circumscribes (or alternatively may be circumscribed by) and axially overlaps the outer platform 48. The outer sidewall 30 radially engages (e.g., contacts) and may be axially movable (e.g., slidable) along the outer platform 48. The slip joint 67 may thereby facilitate relative thermally induced axial movement between the combustor 14 and the exit nozzle 16.

The fuel injectors 56 of FIG. 2 are distributed circumferentially about the axial centerline 24 in an annular array. Each of these fuel injectors 56 is fluidly coupled with a respective one of the fuel conduits 54. Each of the fuel injectors 56 of FIG. 3 is configured with (e.g., arranged with and/or connected to) the combustor 14 and its outer sidewall 30. Each fuel injector 56 of FIG. 3, for example, is connected to the combustor 14 and its outer sidewall 30, and arranged at a port 68 (e.g., a dilution chute, an opening, a through-hole, a flow guide, etc.) to the combustion chamber 42. Each fuel injector 56 of FIG. 3, for example, is disposed at a distal end of the respective fuel conduit 54, and formed integral with the outer sidewall 30. Each fuel injector 56, for example, may be configured as a nozzle 70 (e.g., an outlet orifice) in an endwall 72 for the respective fuel conduit 54. Alternatively, one or more of the fuel injectors 56 may be formed discrete from the respective fuel conduit 54.

During operation of the turbine engine system 10 of FIG. 1, compressed gas (e.g., air) is directed from a compressor section 74 (e.g., see FIG. 6) through an (e.g., annular) combustor section inlet passage 76 into the diffuser plenum 28. This compressed gas is diffused within the diffuser plenum 28 and subsequently enters the combustion chamber 42 through the ports 68 (e.g., dilution chutes) and/or one or more other openings into the combustion chamber 42. Concurrently, the fuel manifold 52 directs fuel into each fuel conduit 54. Each fuel conduit 54 directs the fuel received from the fuel manifold 52 to the respective fuel injector 56. Each fuel injector 56 directs (e.g., injects) the fuel received from the respective fuel conduit 54 into the combustion chamber 42 (or another upstream volume) for subsequent mixing with the diffused compressed gas and combustion within the combustion chamber 42. The combustion products are directed out of the combustor 14 and its combustion chamber 42 through the exit nozzle 16 and to a turbine section 78 (e.g., see FIG. 6).

Figure 3B:
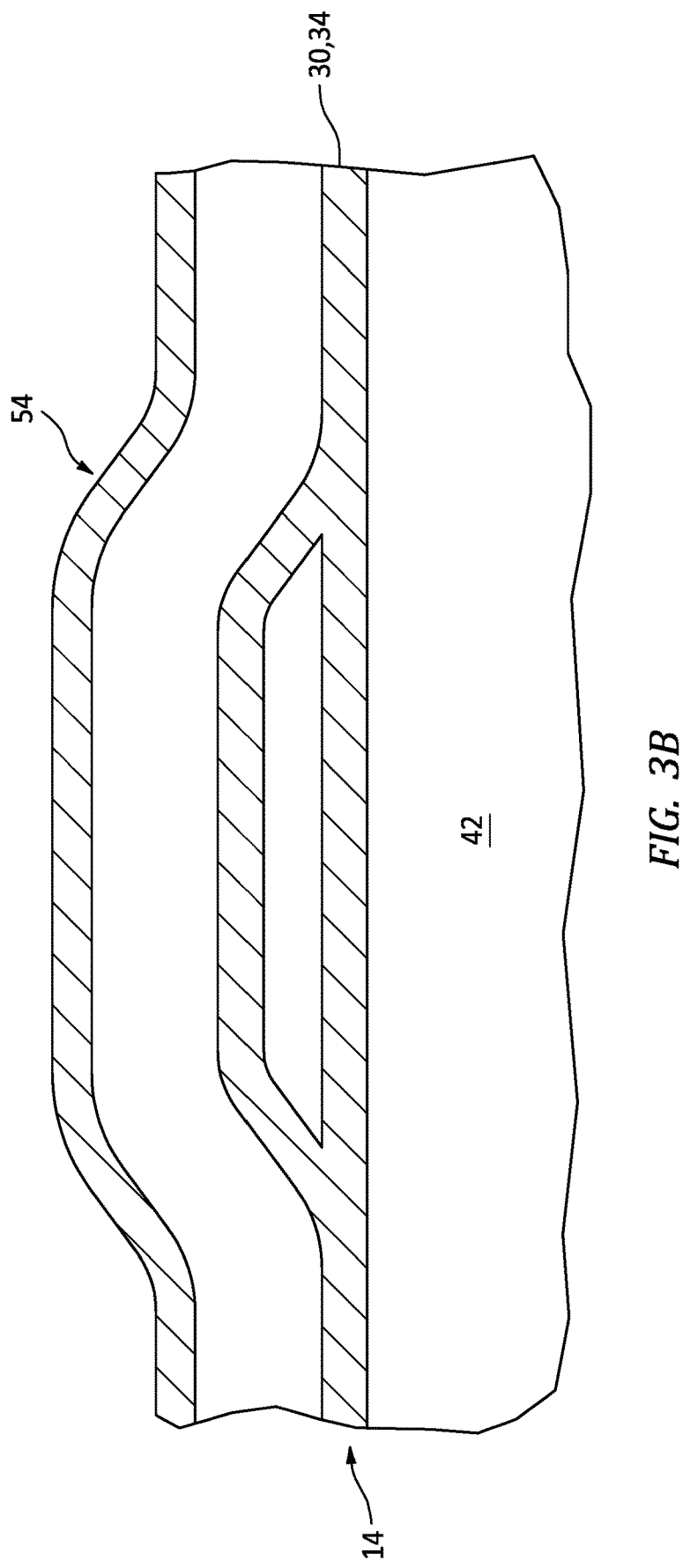
FIG. 3B is a side sectional illustration of a length of the fuel conduit selectively spaced from the combustor.

During the combustion process, thermal energy transfers from the combustion products into the combustor walls 30, 32 and 34 thereby heating the combustor walls 30, 32 and 34. Some of this thermal energy is transferred into the fuel flowing through the fuel conduits 54. This transfer of thermal energy heats the fuel; e.g., preheats the fuel for enhanced combustion. The heating of the fuel may be tailored by routing the fuel conduits 54 along the combustor walls 30 and/or 34 to overlap otherwise hot spots and/or cold spots in the combustor walls 30 and/or 34. To further tailor heating of the fuel, referring to FIG. 3B, one or more segments of a fuel conduit 54 may extend along and may be spaced (e.g., via a gap) from the combustor 14 and its the walls 30 and/or 34. Integrating the fuel conduits 54 with the combustor 14 and its combustor walls 30 and/or 34 as well as the outer case 20 as described above may also simplify manufacture of the turbine engine system 10 where, for example, the turbine engine system 10 is formed using additive manufacturing.

In some embodiments, referring to FIG. 4, at least a segment or an entirety of one or more or all of the fuel conduits 54 may each be laterally (e.g., circumferentially) aligned with the respective fuel injector 56 connected to that fuel conduit 54. The fuel conduit 54 and the fuel injector 56 of FIG. 4, for example, are circumferentially clocked about the axial centerline 24 at a common circumferential position. In other embodiments, referring to FIG. 5, at least a segment or an entirety of one or more or all of the fuel conduits 54 may each be laterally offset from/misaligned with the respective fuel injector 56 connected to that fuel conduit 54. A segment 80 of the fuel conduit 54 integrated with and extending along the bulkhead 34 and/or a segment 82 of the fuel conduit 54 integrated with and extending along the outer sidewall 30 of FIG. 5, for example, is/are circumferentially clocked from the fuel injector 56 about the axial centerline 24 between five degrees (5°) and twenty-five degrees (25°); e.g., between five degrees (5°) and fifteen degrees (15°) or between fifteen degrees (15°) and twenty-five degrees (25°). Of course, in other embodiments, the fuel conduit segment 80, 82 may be clocked from the fuel injector 56 about the axial centerline 24 less than five degrees (5°), but more than zero degrees (0°). In still other embodiments, the fuel conduit segment 80, 82 may be clocked from the fuel injector 56 about the axial centerline 24 more than twenty-five degrees (25°).

In some embodiments, referring to FIG. 4, at least a segment or an entirety of one or more or all of the fuel conduits 54 may each follow a straight longitudinal trajectory 84A along the combustor 14 when viewed, for example, along the exterior 64 of the combustor 14; e.g., a plane parallel with/tangent to the combustor wall 30, 34. The longitudinal trajectory 84A of the fuel conduit 54 of FIG. 4, for example, only includes an axial component and a radial component (e.g., see FIG. 3) as the fuel conduit 54 extends from the fuel manifold 52 to the fuel injector 56. This may provide a relatively short flowpath from the fuel manifold 52 to the fuel injector 56, which may provide relatively minimal fuel preheating and/or combustor wall cooling. In other embodiments, referring to FIG. 5, at least a segment or an entirety of one or more or all of the fuel conduits 54 may each follow a non-straight (e.g., a curved, a tortuous, a compound, etc.) trajectory 84B along the combustor 14 when viewed, for example, along the exterior 64 of the combustor 14; e.g., a plane parallel with/tangent to the combustor wall 30, 34. The longitudinal trajectory 84B of the fuel conduit 54 of FIG. 5, for example, includes an axial component, a radial component (e.g., see FIG. 3) and a circumferential component as the fuel conduit 54 extends from the fuel manifold 52 to the fuel injector 56. This may provide a relatively long flowpath from the fuel manifold 52 to the fuel injector 56, which may provide increased fuel preheating and/or combustor wall cooling.

Various components of the turbine engine assembly 10 of FIG. 1 may be formed together in/as a monolithic body. Herein, the term "monolithic" may describe an apparatus which is formed as a single unitary body. For example, any adjacent two or more or all of the turbine engine components 20, 22, 30, 32, 34, 44, 46, 48, 50, 52, 54, 56 and/or 57 (see also FIG. 2) (e.g., the entire turbine engine assembly 10) may be additively manufactured, cast, machined and/or otherwise formed together as a unitary body. By contrast, a non-monolithic structure includes discretely formed bodies that are subsequently mechanically fastened and/or otherwise removably attached together.

Figure 6:
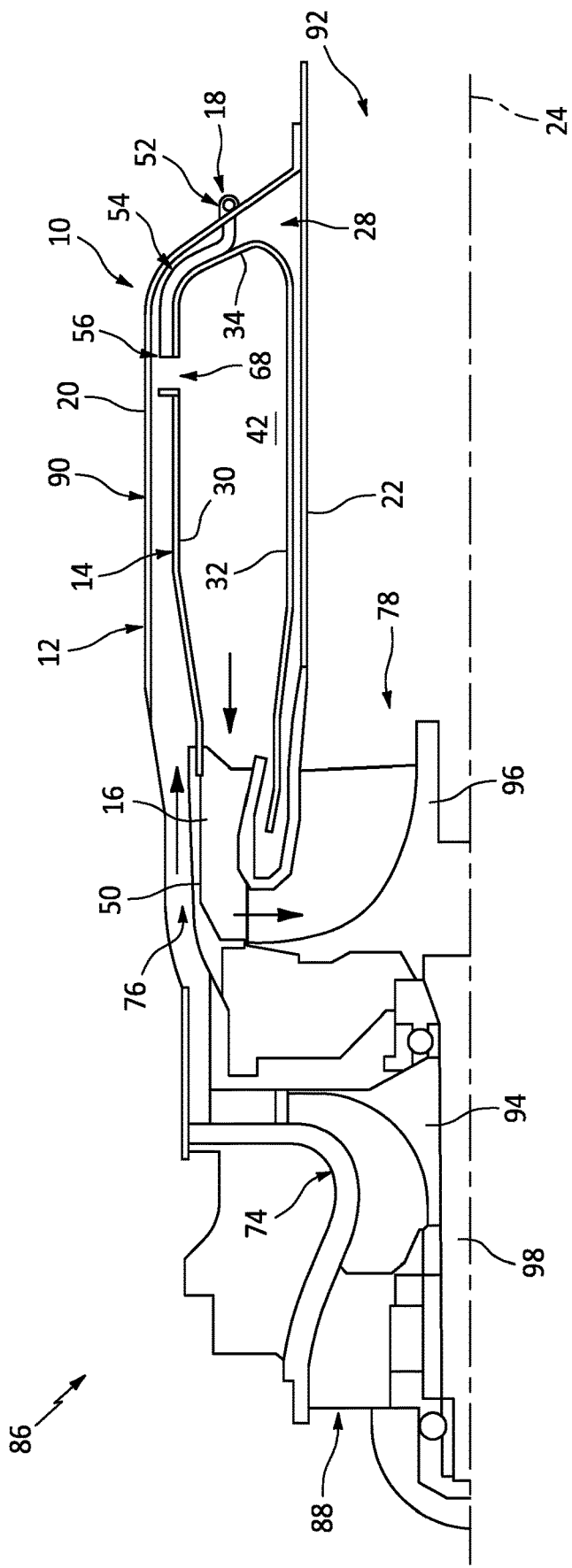
FIG. 6 is a partial, schematic illustration of a gas turbine engine which may include the turbine engine assembly.

FIG. 6 schematically illustrates a single spool, radial-flow turbojet gas turbine engine 86 with which the turbine engine assembly 10 may be included. This gas turbine engine 86 may be configured for propelling an unmanned aerial vehicle (UAV), a drone, or any other manned or unmanned aircraft or self-propelled projectile. In the specific embodiment of FIG. 6, the gas turbine engine 86 includes an upstream inlet 88, the (e.g., radial) compressor section 74, a combustor section 90 with the combustor 14 and the combustion chamber 42, the (e.g., radial) turbine section 78 and a downstream exhaust 92 fluidly coupled in series. A compressor rotor 94 in the compressor section 74 is coupled with a turbine rotor 96 in the turbine section 78 by a shaft 98, which shaft 98 may rotate about the axial centerline 24.

The gas turbine engine 86 is described above as a single spool, radial-flow turbojet gas turbine engine for ease of description. The present disclosure, however, is not limited to such an exemplary gas turbine engine. The gas turbine engine 86, for example, may alternatively be configured as an axial flow gas turbine engine. The gas turbine engine 86 may be configured as a direct drive gas turbine engine. The gas turbine engine 86 may alternatively include a gear train that connects one or more rotors together such that the rotors rotate at different speeds. The gas turbine engine 86 may be configured with a single spool (e.g., see FIG. 6), two spools, or with more than two spools. The gas turbine engine 86 may be configured as a turbofan engine, a turbojet engine, a propfan engine, a pusher fan engine or any other type of turbine engine. In addition, while the gas turbine engine 86 is described above with an exemplary reverser flow annular combustor, the gas turbine engine 86 may also or alternatively include any other type/configuration of annular, tubular (e.g., CAN), axial flow and/or reverser flow combustor. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a gas turbine engine, comprising:
a combustor comprising a combustor wall that forms a peripheral boundary of a combustion chamber within the combustor;
a fuel conduit extending along and formed integral with the combustor wall, the fuel conduit disposed outside of the combustion chamber;
a turbine engine case with a plenum formed by and disposed between the turbine engine case and the combustor wall; and
a fuel manifold extending along and formed integral with the turbine engine case, the fuel manifold fluidly coupled with the fuel conduit.

2. The assembly of claim 1, further comprising:
a fuel injector arranged with the combustor;
the fuel injector configured to receive fuel from the fuel conduit and inject the fuel into the combustion chamber.

3. The assembly of claim 2, wherein the fuel injector is formed integral with the combustor and the fuel conduit.

4. The assembly of claim 1, further comprising:
a second fuel conduit extending along and formed integral with the combustor wall;
the second fuel conduit disposed outside of the combustion chamber; and
the fuel manifold fluidly coupled with the second fuel conduit.

5. The assembly of claim 1, wherein a segment of the fuel conduit projects out from the combustor, through the plenum, to the turbine engine case.

6. The assembly of claim 1, wherein
the combustor includes an inner sidewall, an outer sidewall and a bulkhead extending radially between and connected to the inner sidewall and the outer sidewall; and
the bulkhead comprises the combustor wall.

7. The assembly of claim 6, wherein the fuel conduit further extends along and is formed integral with the outer sidewall.

8. The assembly of claim 1, further comprising:
a fuel injector arranged with the combustor and fluidly coupled with the fuel conduit; and
a segment of the fuel conduit laterally offset from the fuel injector.

9. The assembly of claim 1, further comprising:
a fuel injector arranged with the combustor and fluidly coupled with the fuel conduit; and
a segment of the fuel conduit laterally aligned with the fuel injector.

10. The assembly of claim 1, wherein at least a segment of the fuel conduit follows a straight trajectory as the fuel conduit extends along the combustor wall.

11. The assembly of claim 1, wherein at least a segment of the fuel conduit follows a non-straight trajectory as the fuel conduit extends along the combustor wall.

12. The assembly of claim 1, wherein a segment of the fuel conduit extends along and is spaced from the combustor wall.

13. The assembly of claim 1, further comprising:
a nozzle; and
the combustor meeting the nozzle at a slip joint between the combustor and the nozzle.

14. An assembly for a gas turbine engine, comprising:
a combustor comprising a combustor wall that forms a peripheral boundary of a combustion chamber within the combustor; and
a fuel conduit extending along and formed integral with the combustor wall, the fuel conduit disposed outside of the combustion chamber;
wherein the combustor includes an inner sidewall, an outer sidewall and a bulkhead extending radially between and connected to the inner sidewall and the outer sidewall; and
wherein the outer sidewall comprises the combustor wall.

15. An assembly for a gas turbine engine, comprising:
a combustor comprising a combustor wall that forms a peripheral boundary of a combustion chamber within the combustor;
a fuel conduit extending along and formed integral with the combustor wall, the fuel conduit disposed outside of the combustion chamber; and
a fuel injector arranged with the combustor and fluidly coupled with the fuel conduit;
a segment of the fuel conduit laterally offset from the fuel injector, and the segment of the fuel conduit is circumferentially clocked from the fuel injector about a centerline of the gas turbine engine between five degrees and twenty-five degrees.

16. An assembly for a gas turbine engine, comprising:
a combustor including an outer sidewall, an inner sidewall, a bulkhead and a combustion chamber, the combustion chamber extending radially within the combustor between the outer sidewall and the inner sidewall, and the combustion chamber extending axially within the combustor to the bulkhead; and
a fuel conduit extending along and connected to the bulkhead, at least the fuel conduit and the bulkhead formed together in a monolithic body.

17. The assembly of claim 16, wherein the fuel conduit also extend along and is connected to the outer sidewall.

18. The assembly of claim 16, wherein the fuel conduit is disposed outside of the combustor.

* * * * *